United States Patent
Yew et al.

(10) Patent No.: US 7,560,195 B2
(45) Date of Patent: Jul. 14, 2009

(54) ELECTROLYTE FOR LITHIUM BATTERY AND LITHIUM BATTERY COMPRISING THE SAME

(75) Inventors: Kyoung-Han Yew, Suwon-si (KR); Eui-Hwan Song, Suwon-si (KR)

(73) Assignee: Samsung SDI Co., Ltd., Suwon-si (KR)

(*) Notice: Subject to any disclaimer, the term of this patent is extended or adjusted under 35 U.S.C. 154(b) by 0 days.

(21) Appl. No.: 12/119,453

(22) Filed: May 12, 2008

(65) Prior Publication Data

US 2008/0213673 A1 Sep. 4, 2008

Related U.S. Application Data

(62) Division of application No. 11/093,952, filed on Mar. 29, 2005, now abandoned.

(30) Foreign Application Priority Data

Mar. 30, 2004 (KR) ............................ 2004-0021589

(51) Int. Cl.
*H01M 6/16* (2006.01)

(52) U.S. Cl. ....................... 429/340; 429/341; 429/307; 429/200; 429/231.95; 429/326; 429/332; 429/330; 429/336; 429/337; 429/338; 429/342; 252/62.2

(58) Field of Classification Search ................. 429/340, 429/341, 307, 200, 231.95, 326, 332, 330, 429/336, 337, 338, 342; 252/62.2
See application file for complete search history.

(56) References Cited

U.S. PATENT DOCUMENTS

| 5,709,968 A | 1/1998 | Shimizu |
| 5,879,834 A | 3/1999 | Mao |
| 6,413,677 B1 | 7/2002 | Hamamoto et al. |
| 6,913,856 B2 * | 7/2005 | Nirasawa et al. ............ 429/340 |
| 2003/0190529 A1 | 10/2003 | Kim et al. |

FOREIGN PATENT DOCUMENTS

| CN | 1322028 A | 11/2001 |
| CN | 1449070 A | 10/2003 |
| JP | 08-293323 A | 11/1996 |
| JP | 08-306387 A | 11/1996 |
| JP | 09-022722 A | 1/1997 |
| JP | 11-162511 A | 6/1999 |
| JP | 2000-058113 A | 2/2000 |
| JP | 2000-195546 | 7/2000 |
| JP | 2001-052735 A | 2/2001 |
| JP | 2003-243026 A | 8/2003 |
| JP | 2004-296237 A | 10/2004 |
| KR | 10-2004-0021393 | 3/2004 |

OTHER PUBLICATIONS

Patent Abstracts of Japan, Publication No. 08-306387, Published Nov. 22, 1996, in the name of Suzuki, et al.
Patent Abstracts of Japan, Publication No. 9-22722, Published on Jan. 21, 1997, in the name of Suzuki, et al.
Patent Abstracts of Japan, Publication No. 2000-195546, Published on Jul. 14, 2000, in the name of Hamamoto, et al.
Korean Patent Abstracts, Publication No. 10-2004-0021393, Published on Mar. 10, 2004, in the name of Lee.

* cited by examiner

*Primary Examiner*—Laura S Weiner
(74) *Attorney, Agent, or Firm*—Christie Parker & Hale LLP

(57) ABSTRACT

An electrolyte for a lithium battery and a lithium battery thereof are provided. The electrolyte includes a non-aqueous organic solvent; lithium salt; and an additive selected from the group consisting of the compounds represented by formulas (1) to (3), and combinations thereof:

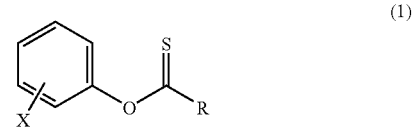

(1)

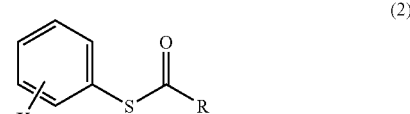

(2)

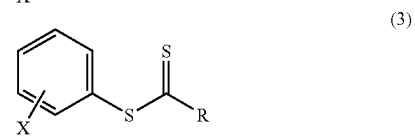

(3)

where X is selected from the group consisting of hydrogen, halogen, alkyl groups having from 1 to 6 carbon atoms, and aryl groups having from 6 to 8 carbon atoms, and R is an alkyl group having from 1 to 6 carbon atoms or an aryl group having from 6 to 10 carbon atoms. The lithium battery including the electrolyte suggested in the present invention has superior overcharge characteristics and superior safety characteristics compared to conventional batteries including a non-aqueous electrolyte.

28 Claims, 3 Drawing Sheets

ELECTROLYTE FOR LITHIUM BATTERY AND LITHIUM BATTERY COMPRISING THE SAME

CROSS-REFERENCE TO RELATED APPLICATION(S)

This application is a divisional application of U.S. patent application Ser. No. 11/093,952, filed on Mar. 29, 2006 which claims priority to and the benefit of Korean Patent Application No. 10-2004-0021589 filed in the Korean Intellectual Property Office on Mar. 30, 2004, the entire content of which is incorporated herein by reference.

FIELD OF THE INVENTION

The present invention relates to an electrolyte for a lithium battery and a lithium battery comprising the same, and more specifically to an electrolyte for a lithium battery having excellent safety characteristics and a lithium battery comprising the same.

BACKGROUND OF THE INVENTION

Recently, in accordance with the trend of smaller and lighter portable electronic equipment, the need for high performance and high capacity batteries used for the power sources for such equipment is increasing. At present, commercially available lithium rechargeable batteries are 4 V-grade batteries with an average discharge potential of 3.7 V. These are rapidly being employed for the so-called 3 C devices comprising cellular phones, notebook computers, and camcorders, which have become essential elements in the digital era.

Along with improving the capacity and performance characteristics of batteries, studies to improve the safety such as overcharge characteristics are being actively conducted. Upon overcharge of a battery, depending on the battery's state of recharge, an excess amount of lithium is deposited on the positive electrode, while an excess amount of lithium is inserted into on the negative electrode. Consequently, the positive and negative electrodes are thermally unstable which can result in a rapid exothermic reaction such as is due to the decomposition of the organic solvent, and can also lead to a thermal runaway phenomenon causing a serious safety problem.

To overcome such problems, aromatic compounds have been added to the electrolyte as redox shuttle additives. For example, U.S. Pat. No. 5,709,968 discloses a non-aqueous lithium ion battery that prevents the thermal runaway phenomenon resulting from overcharge by adding a benzene compound such as 2,4-difluoroanisole to the electrolyte. In addition, U.S. Pat. No. 5,879,834 discloses a method for improving battery safety by adding a small amount of an aromatic compound such as biphenyl, 3-chlorothiophene, furan, or the like to the electrolyte which is electrochemically polymerized during an unusual overvoltage condition to increase the internal resistance of the battery. Such redox shuttle additives increase the internal temperature of a battery at an early stage with the heat generated by the oxidation-reduction reaction shutting down the pores of a separator quickly and uniformly to prevent an overcharge reaction. Moreover, upon overcharge, the polymerization reaction of the redox shuttle additive on the surface of the electrodes consumes the overcharge current, further protecting the battery.

However, as batteries increase in capacity in accordance with customers' needs, the use of such additives cannot fully satisfy the requirement for a high level of battery safety. Consequently, with the increasing demand for high capacity batteries, alternative additives or electrolyte systems are required to ensure battery safety.

Furthermore, Japanese Patent Laid-Open Nos. 1997-22722 and 1996-306387 disclose a lithium ion battery with an improved affinity between the carbon electrode and the non-aqueous electrolyte, and with improved energy density, by using an electrolyte solution including a liquid-phase organic solvent selected from esters, ethers, and phenyl group-containing carbonates having a molecular weight of 108 to 220, in which the carbon electrode is used after dipping in the electrolyte solution. Nonetheless, such batteries have decreased safety upon high-rate overcharge as well as upon exposure to high temperature.

SUMMARY OF THE INVENTION

In one embodiment of the present invention, an electrolyte for a lithium battery is provided for improving the safety characteristics of a battery.

In another embodiment of the present invention, a lithium battery is provided including the electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In accordance with one embodiment of the present invention, an electrolyte for a lithium battery is provided including a non-aqueous organic solvent; a lithium salt; and an additive selected from the group consisting of compounds represented by the following Formula 1, Formula 2, and combinations thereof:

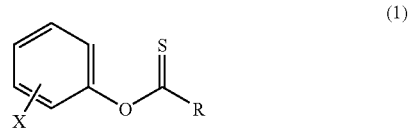

(1)

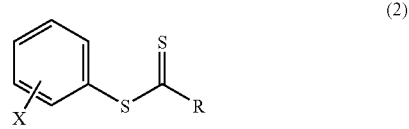

(2)

where X is selected from hydrogen, halogens, alkyl groups having from 1 to 6 carbon atoms, and aryl groups having from 6 to 8 carbon atoms, and R is an alkyl group having from 1 to 6 carbon atoms or an aryl group having from 6 to 10 carbon atoms.

In accordance with another embodiment of the present invention, a lithium battery is provided including the above electrolyte; a positive electrode comprising a positive active material capable of intercalating and deintercalating lithium ions; and a negative electrode comprising a negative active material capable of intercalating and deintercalating lithium ions.

Figure 1:
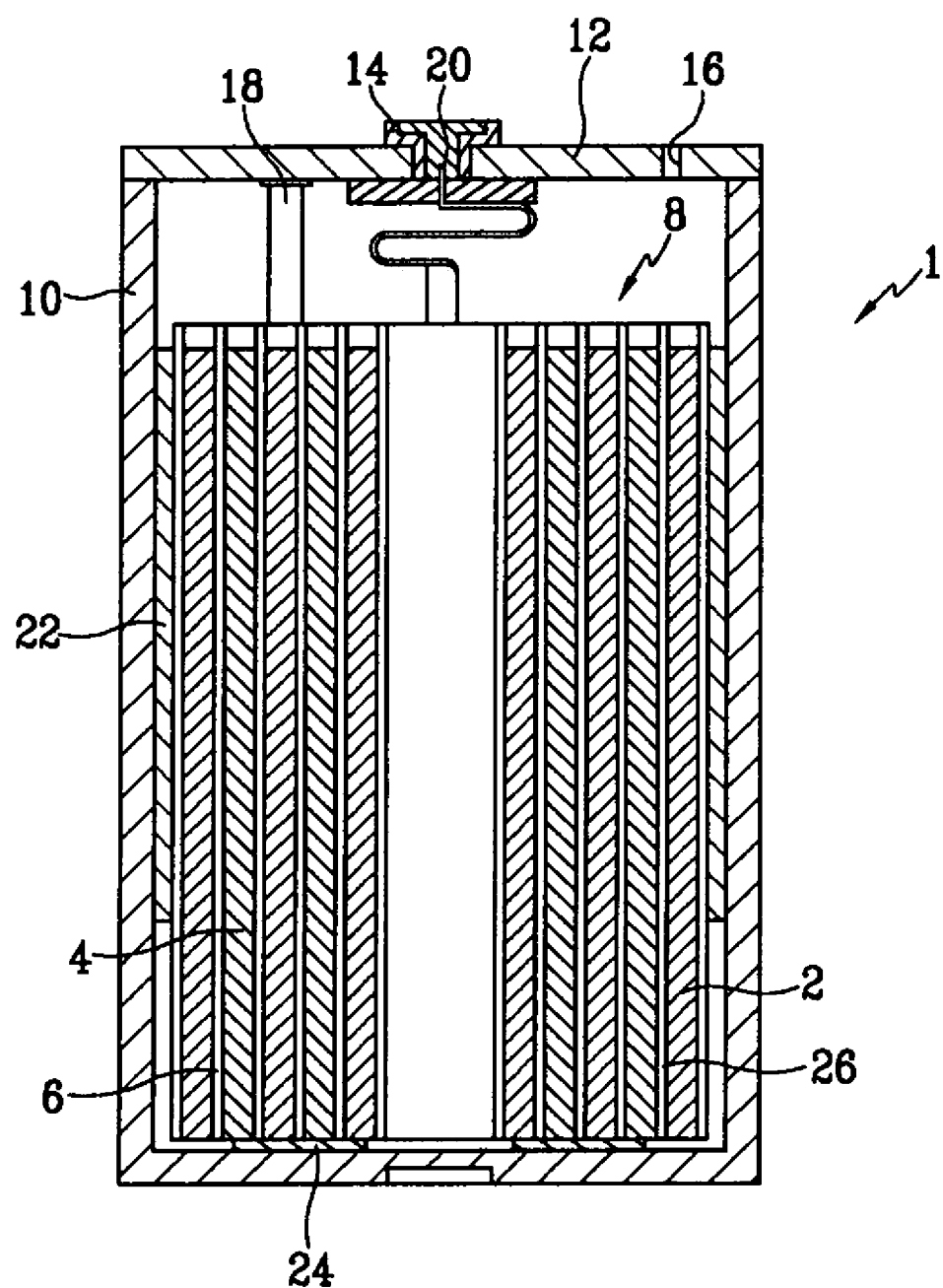
FIG. 1 is a schematic view of a lithium battery according to the present invention.

One embodiment of the non-aqueous lithium battery according to the present invention is shown in FIG. 1. The lithium battery 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6 which is made of polyethylene, polypropylene, or multilayered polyethylene/polypropylene. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

In a lithium battery, the temperature of the battery tends to increase abruptly upon overcharge. Overcharge can occur due to incorrect operation, due to a break-down of the battery, or due to a short circuit occurrence caused by a defect in battery design. The abrupt increase in temperature can lead to thermal runaway. During overcharge, an excessive amount of lithium ions are released from the positive electrode and deposited on the surface of the negative electrode to render the positive and negative electrodes unstable. As a result, exothermic reactions such as pyrolysis of the electrolyte, reactions between the electrolyte and lithium, oxidation reactions of the electrolyte with the positive electrode, reactions between the electrolyte and oxygen gas generated by the pyrolysis of the positive active material, or other reactions can rapidly increase the temperature inside the battery to cause thermal runaway. Such thermal runaway results in the generation of fire and smoke.

An electrolyte for a lithium battery of the present invention can improve safety during an overcharge condition by including an additive selected from the group consisting of the compounds represented by the following formulas (1) to (3), and combinations thereof:

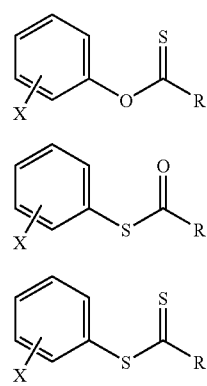

where X is selected from hydrogen, halogens, alkyl groups having from 1 to 6 carbon atoms, and aryl groups having from 6 to 8 carbon atoms, and R is an alkyl group having from 1 to 6 carbon atoms or an aryl group having from 6 to 10 carbon atoms.

Exemplary additives include thioacetic acid O-phenyl ester, thioacetic acid S-phenyl ester, dithioacetic acid phenyl ester, and combinations thereof. One particularly preferred additive is thioacetic acid S-phenyl ester.

The addition of an additive compound represented by formulas (1) to (3), or combinations thereof improves safety of a lithium battery as follows: The additive starts to polymerize at a voltage of more than about 4.5V, coating the surfaces of the electrodes resulting in increased resistance between the positive electrode and the negative electrode; at a voltage of more than about 4.5V, oxidation and reduction reactions result in a consumption of the current applied at overcharge.

The additive is added in an amount from 0.01 to 10 wt %, preferably from 0.05 to 5 wt %, and more preferably from 0.05 to 2 wt % based on the total amount of the electrolyte. The improvement is not realized sufficiently when the compound is used in an amount less than 0.01 wt %, and the cycle life characteristics of the battery decrease when the compound is used in an amount exceeding 10 wt %.

An electrolyte including the additive also includes a lithium salt and a non-aqueous organic solvent. The lithium salt acts as a supply source of lithium ions in the battery, making the basic operation of the lithium battery possible. The non-aqueous organic solvent acts as a medium for mobilizing ions capable of participating in the electrochemical reaction.

The lithium salt is preferably selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI and combinations thereof.

The concentration of the lithium salt is preferably in the range of 0.6 to 2.0 M and more preferably in the range of 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase in electrolyte viscosity.

The non-aqueous organic solvent is selected from carbonate-based solvents, ester-based solvents, ether-based solvents, ketone-based solvents, and mixtures thereof. Examples of carbonate-based solvents include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), and the like. Examples of ester-based solvents include n-methyl acetate, n-ethyl acetate, n-propyl acetate, and the like. Examples of ether-based solvents include dibutyl ether and the like. Examples of ketone-based solvents include polymethyl vinyl ketone and the like.

In one embodiment, it is advantageous to use a mixture of a chain carbonate and a cyclic carbonate as the non-aqueous organic solvent. The cyclic carbonate and the chain carbonate are preferably mixed together in a volume ratio of between 1:1 to 1:9. When the cyclic carbonate and the chain carbonate are mixed in the volume ratio of between 1:1 to 1:9, and the mixture is used as an electrolyte, the electrolyte performance may be enhanced.

In addition, the electrolyte of the present invention may further include mixtures of the carbonate solvents and one or more aromatic solvents. Exemplary aromatic solvents include those represented by Formula (4):

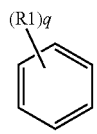

(4)

where R1 is selected from the group consisting of halogens, alkyl groups having from 1 to 10 carbon atoms, and combinations thereof, and q is an integer from 0 to 6.

Specific examples of aromatic solvents according to formula (4) include benzene, fluorobenzene, toluene, xylene, and the like. Other suitable aromatic solvents include fluorotoluene and trifluorotoluene. For an electrolyte including an aromatic solvent, the volume ratio of the carbonate solvent and the aromatic solvent is preferably from 1:1 to 30:1 to obtain the desirable performance of the electrolyte.

The electrolyte of the present invention is prepared by adding a lithium salt and an additive to a non-aqueous solvent. It is usual to add an additive to a non-aqueous solvent in which lithium salt is dissolved, but the addition order of lithium salt and the additive is not important.

In another embodiment of the present invention, a lithium battery is provided including the electrolyte.

The lithium battery of the present invention comprises the electrolyte including the additive, a non-aqueous organic solvent, and a lithium salt; a positive electrode including a positive active material capable of intercalating and deintercalating lithium ion; and a negative electrode including a negative active material capable of intercalating and deintercalating lithium ion.

The positive active material for the lithium battery may comprise a compound capable of reversibly intercalating/deintercalating lithium ion or a material capable of forming a compound containing lithium by reversibly reacting with lithium. Representative examples of such positive active materials include lithium-transition metal oxides such as $LiCoO_2$, $LiNiO_2$, $LiMnO_2$, $LiMn_2O_4$, or $LiNi_{1-x-y}Co_xM_yO_2$ (where $0 \leq x \leq 1$, $0 \leq y \leq 1$, $0 \leq x+y \leq 1$, and M is an transition or lanthanide element selected from the group consisting of Al, Cr, Mn, Fe, Mg, La, Ce, Sr, V, and combinations thereof).

The negative active material comprises a carbon material capable of reversibly intercalating/deintercalating lithium ions. Examples include carbon-based negative active material such as a crystalline or amorphous carbon and carbon composites.

The lithium battery of the present invention may be prepared using the following procedure.

First, a composite material for forming an electrolyte is prepared by adding an additive selected from the group consisting of the compounds represented by the above formulae (1) to (3) and combinations thereof to a non-aqueous organic solvent including a lithium salt.

The positive and negative electrodes are fabricated by conventional processes. A separator of an insulating resin with a network structure is then interposed between the positive and negative electrodes. The whole is wound or stacked to fabricate an electrode assembly, and then the electrode assembly is inserted into a battery case and sealed.

Examples of the separator include polyethylene separators, polypropylene separators, polyethylene/polypropylene double-layered separators, polyethylene/polypropylene/polyethylene three-layered separators, and polypropylene/polyethylene/polypropylene three layered separators. A cross-sectional view of the lithium battery prepared by the above process is illustrated in FIG. 1 as described in further detail above.

The electrolyte of the present invention can be applied to all types of lithium batteries, including lithium primary batteries and lithium secondary batteries.

The lithium secondary battery of the invention provide significantly improved overcharge properties compared to conventional batteries using non-aqueous electrolytes.

The following examples further illustrate the present invention in detail but are not to be construed to limit the scope thereof.

COMPARATIVE EXAMPLE 1

94 g of $LiCoO_2$ as a positive active material, 3 g of Super-P (acetylene black) as a conductive agent, and 3 g of polyvinylidene fluoride (PVDF) as a binder were dissolved in N-methyl-2-pyrolidone (NMP) to prepare a positive active material slurry. The resulting slurry was then coated onto aluminum-foil having a width of 4.9 cm and a thickness of 147 μm, dried and pressed, and a positive electrode was cut to a predetermined size.

89.8 g of mesocarbon fiber (MCF: Petoca Ltd.) as a negative active material, 0.2 g of oxalic acid as an additive, and 10 g of polyvinylidene fluoride (PVDF) as a binder were dissolved in 10 g of N-methyl-2-pyrolidone(NMP) to prepare a negative active material slurry. The resulting slurry was then coated onto copper-foil having a width of 5.1 cm and a thickness of 178 μm, dried and pressed, and a negative electrode was cut to a predetermined size.

Between the manufactured positive and negative electrodes, a polyethylene film separator was interposed followed by winding to fabricate an electrode assembly. The electrode assembly was placed into a battery case and 2.3 g of liquid electrolyte was injected into the case under vacuum, thus completing the fabrication of the lithium secondary battery cell.

For the electrolyte, a 1.3M solution of $LiPF_6$ in a mixed solvent of ethylene carbonate (EC), ethylmethyl carbonate (EMC), dimethyl carbonate (DMC), and fluorobenzene in a volume ratio of 30:55:5:10 was used.

COMPARATIVE EXAMPLE 2

A lithium rechargeable battery cell was prepared as set forth in Comparative Example 1, except that the electrolyte was prepared by adding 0.15 g of phenyl acetate as an additive to 5 g of the liquid electrolyte of Comparative Example 1.

EXAMPLE 1

A lithium rechargeable battery cell was prepared as set forth in Comparative Example 1, except that the electrolyte was prepared by adding 0.15 g of thioacetic acid O-phenyl ester as an additive to 5 g of the liquid electrolyte of Comparative Example 1.

EXAMPLE 2

A lithium rechargeable battery cell was prepared as set forth in Comparative Example 1, except that the electrolyte was prepared by adding 0.15 g of thioacetic acid S-phenyl ester as an additive to 5 g of the liquid electrolyte of Comparative Example 1.

EXAMPLE 3

A lithium rechargeable battery cell was prepared as set forth in Comparative Example 1, except that the electrolyte was prepared by adding 0.15 g of thioacetic acid phenyl ester as an additive to 5 g of the liquid electrolyte of Comparative Example 1.

EXPERIMENTAL EXAMPLE 1

The prismatic battery cells of Examples 1 and 2 and Comparative Example 1 were charged and discharged at 2 C and their capacities were measured. The results are shown in Table 1. The evaluation results of safety at overcharge are also shown in Table 1. In order to evaluate overcharge safety, after each of the lithium ion battery cells was fully discharged, overcharge was performed by charging at a charge current of 2.37 A between its positive and negative terminals for about 2.5 hours. The changes of charge voltage and temperature were then measured.

TABLE 1

| | Standard capacity (mAh) | 2C capacity (mAh) | Overcharge safety |
|---|---|---|---|
| Example 1 | 810 | 780 | No ignition |
| Example 2 | 760 | 650 | No ignition |
| Comparative Example 1 | 828 | 805 | ignition |

As shown in Table 1, the battery cells of Examples 1 and 2 showed excellent safety at overcharge compared with that of Comparative Example 1, while not decreasing 2 C capacity.

Figure 2:
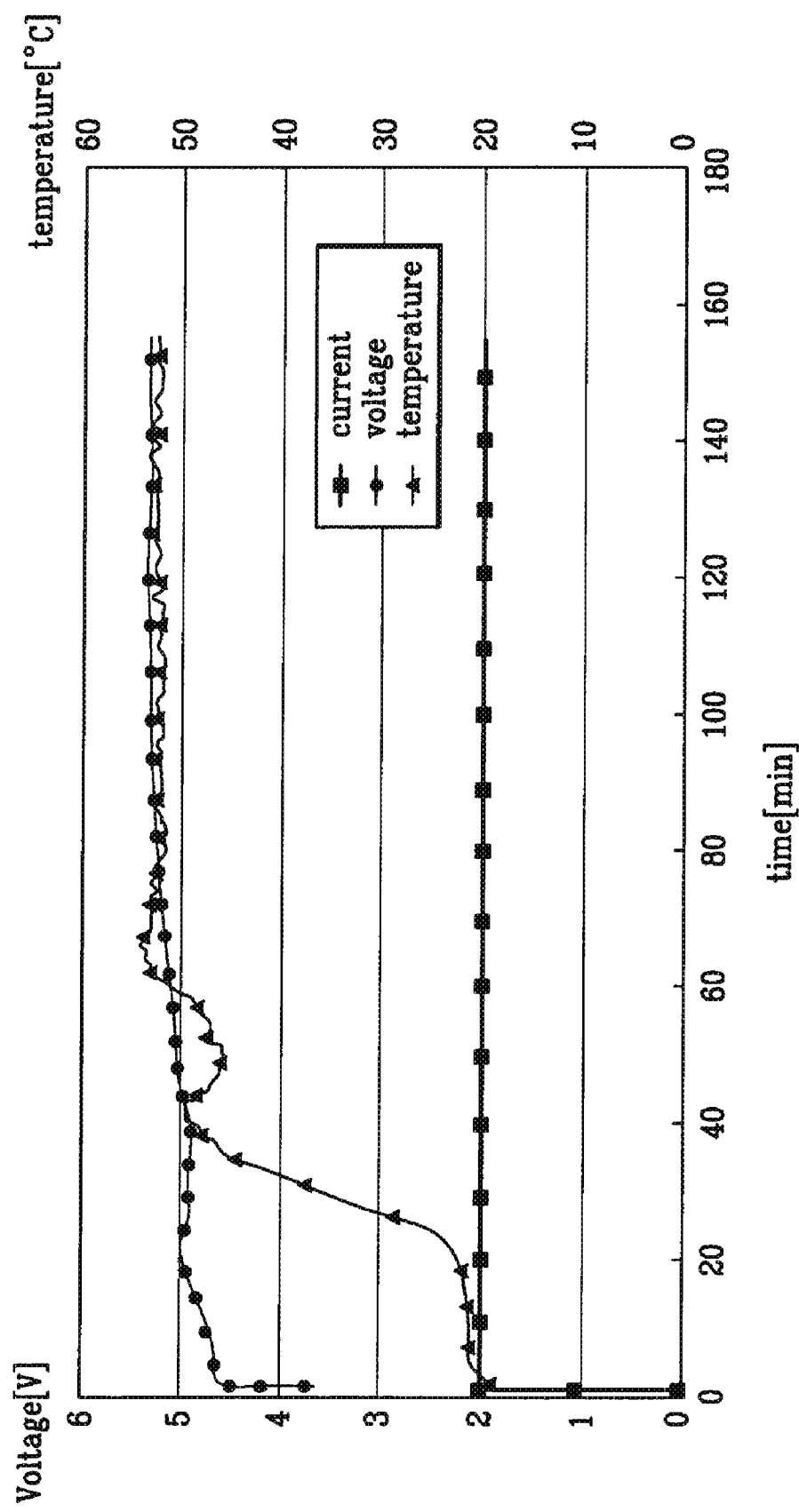
FIG. 2 is a graph illustrating the current, cell temperature, and voltage characteristics of a lithium battery according to Example 1 of the present invention upon overcharge up to 12 V.
Figure 3:
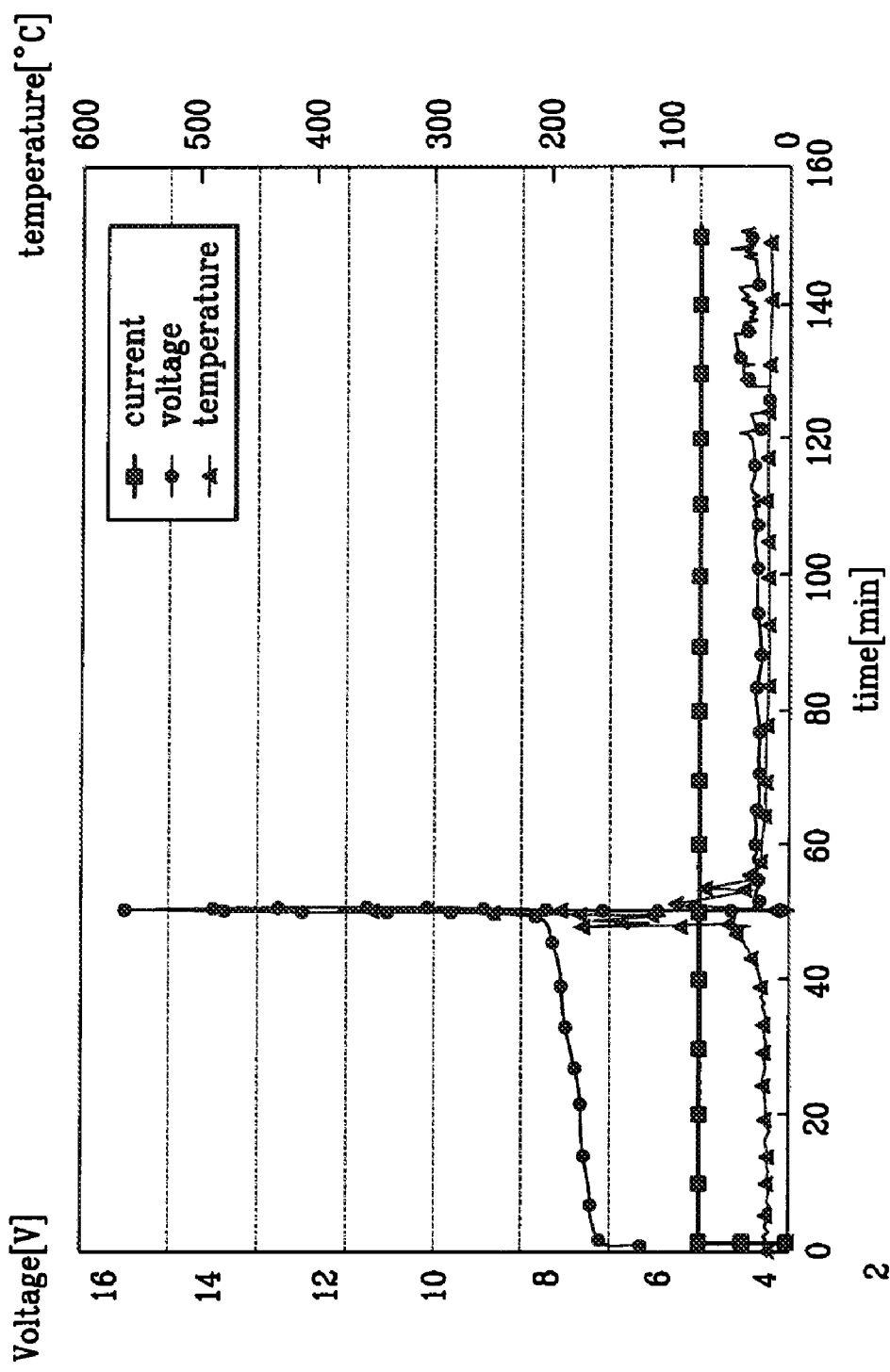
FIG. 3 is a graph illustrating current, cell temperature, and voltage characteristics of a lithium battery according to Comparative Example 1 upon overcharge up to 12 V.

FIGS. 2 and 3 are graphs illustrating the current, temperature, and voltage characteristics when the battery cells of Example 1 and Comparative Example 1 were overcharged at 2.37 A to 12V. As shown in FIG. 2, the battery cell of Example 1 showed good safety by maintaining voltage at overcharge. It is believed that the additive of Example 1 plays a role in preventing increase of voltage to a certain value due to a redox shuttle. In contrast, as shown in FIG. 3, for the battery cell of Comparative Example 1, the temperature rose abruptly, and the voltage dropped to 0 V at 12 V overcharging indicating that a short circuit had taken place.

EXPERIMENTAL EXAMPLE 2

In order to evaluate overcharge safety, each of five lithium ion battery cells made according to each of Examples 1 to 3 and Comparative Example 2 was first fully discharged to 3 V and its positive and negative terminals were resistance-welded with a Ni tap to make a lead wire. Each lithium ion battery cell was connected to a charge/discharge device and was overcharged to 12V by applying overcharge currents of 395 mA, 790 mA, 1185 mA, 1580 mA or 2370 mA between its positive and negative terminals under conditions of constant voltage and constant current. After the overcharge voltage reached 12V, an overcharge current was further applied for approximately 2.5 hours. Each battery was examined for ignition and the results are shown in Table 2.

TABLE 2

| | Overcharge current | | | | | | | | | |
|---|---|---|---|---|---|---|---|---|---|---|
| | 395 mA | | 790 mA | | 1185 mA | | 1580 mA | | 2370 mA | |
| | ignition | no ignition | ignition | no ignition | ignition | no ignition | ignition | no ignition | ignition | no ignition |
| Ex. 1 | 0 | 5 | 0 | 5 | 1 | 4 | — | — | — | — |
| Ex. 2 | 0 | 5 | 0 | 5 | 0 | 5 | 0 | 5 | 0 | 5 |
| Ex. 3 | 0 | 5 | 0 | 5 | 2 | 3 | — | — | — | — |
| Comp. Ex. 2 | 0 | 5 | 0 | 5 | 0 | 5 | 1 | 4 | 3 | 2 |

As shown in Table 2, the battery cells of Example 2 using thioacetic acid S-phenyl ester as an additive were safer than that those of Comparative Example 2 using phenyl acetate.

EXPERIMENTAL EXAMPLE 3

Prismatic battery cells according to Examples 1 to 3 and Comparative Example 2 were charged to a cut-off voltage of 4.2 V and at 0.5 C charge rate, and then were placed in an oven at 85° C. for 4 hours to measure the open circuit voltage (OCV), internal resistance (IR), and thickness(t) of each battery cell. The results are shown in Table 3.

TABLE 3

| | After standard charge | | | After sitting for 4 hours at 85° C. | | |
|---|---|---|---|---|---|---|
| | OCV (V) | IR (mohm) | t(mm) | OCV (V) | IR (mohm) | t(mm) |
| Example 1 | 4.16 | 60.1 | 4.55 | 4.05 | 83.4 | 5.17 |
| Example 2 | 4.17 | 57.4 | 4.45 | 4.11 | 79.8 | 4.84 |
| Example 3 | 4.16 | 63.2 | 4.61 | 4.01 | 92.4 | 5.21 |
| Comparative Example 2 | 4.17 | 51.3 | 4.31 | 0.88 | 430.0 | 5.11 |

As shown in Table 3, while Comparative Example 2 caused a serious problem after being subjected to high temperature in that the open circuit voltage dropped to less than 1V, Examples 1 to 3 experienced no serious change in the open circuit voltage even after being subjected to high temperature.

The lithium battery including an electrolyte suggested in the present invention has superior overcharge characteristics as well as superior safety characteristics compared to conventional batteries including a non-aqueous electrolyte.

The present invention has been described in detail with reference to certain preferred embodiments. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. An electrolyte for a lithium battery comprising:
   a non-aqueous organic solvent;
   a lithium salt; and
   an additive consisting of a compound represented by Formula 2:

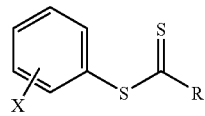

(2)

where X is selected from hydrogen, halogens, alkyl groups having from 1 to 6 carbon atoms, and aryl groups having 6 to 8 carbon atoms, and R is an alkyl group having from 1 to 6 carbon atoms or an aryl group having from 6 to 10 carbon atoms.

2. The electrolyte for a lithium battery according to claim 1, wherein the additive comprises dithioacetic acid phenyl ester.

3. The electrolyte for a lithium battery according to claim 1, wherein the additive is provided in an amount from 0.01 to 10% by weight relative to the total weight of the electrolyte.

4. The electrolyte for a lithium battery according to claim 3, wherein the amount of the additive is from 0.05 to 5% by weight relative to the total electrolyte volume.

5. The electrolyte for a lithium battery according to claim 4, wherein the amount of the additive is from 0.05 to 2% by weight relative to the total weight of the electrolyte.

6. The electrolyte for a lithium battery according to claim 1, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI, and combinations thereof.

7. The electrolyte for a lithium battery according to claim 1, wherein the lithium salt is provided at a concentration from 0.6 to 2.0 M.

8. The electrolyte for a lithium battery according to claim 1, wherein the non-aqueous organic solvent is selected from the group consisting of carbonate-based solvents, ester-based solvents, ether-based solvents, ketone-based solvents, and combinations thereof.

9. The electrolyte for a lithium battery according to claim 8, wherein the solvent is selected from the group consisting of dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), and combinations thereof.

10. The electrolyte for a lithium battery according to claim 8, wherein the solvent is a mixed solvent of a cyclic carbonate and a chain carbonate.

11. An electrolyte for a lithium battery comprising:
    a non-aqueous organic solvent comprising a mixed solvent of a carbonate-based solvent and an aromatic solvent;
    a lithium salt; and
    an additive selected from the group consisting of the compounds represented by Formula 1, Formula 2, and combinations thereof:

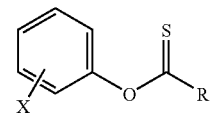

(1)

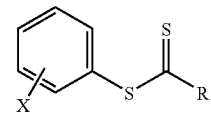

(2)

where X is selected from hydrogen, halogens, alkyl groups having from 1 to 6 carbon atoms, and aryl groups having 6 to 8 carbon atoms, and R is an alkyl group having from 1 to 6 carbon atoms or an aryl group having from 6 to 10 carbon atoms.

12. The electrolyte for a lithium battery according to claim 11, wherein the aromatic solvent is represented by Formula 3:

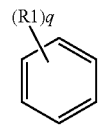

(3)

where R1 is selected from the group consisting of halogens, alkyl groups having from 1 to 10 carbon atoms, and combinations thereof, and q is an integer from 0 to 6.

13. The electrolyte for a lithium battery according to claim 11, wherein the aromatic solvent is selected from the group consisting of benzene, fluorobenzene, toluene, fluorotoluene, trifluorotoluene, xylene, combinations thereof.

14. The electrolyte for a lithium battery according to claim 11, wherein the carbonate solvent and the aromatic solvent are mixed in a volume ratio from 1:1 to 30:1.

15. A lithium battery comprising:
    an electrolyte comprising a non-aqueous organic solvent; a lithium salt; and an additive consisting of a compound represented by Formula 2:

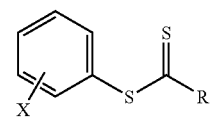

(2)

where X is selected from the group consisting of hydrogen, halogens, alkyl groups having from 1 to 6 carbon atoms, and aryl groups having from 6 to 8 carbon atoms, and R is an alkyl group having from 1 to 6 carbon atoms or an aryl group having from 6 to 10 carbon atoms;

a positive electrode comprising a positive active material being capable of intercalating and deintercalating lithium ions; and a negative electrode comprising a negative active material being capable of intercalating and deintercalating lithium ions.

16. The lithium battery according to claim 15, wherein the additive comprises dithioacetic acid phenyl ester.

17. The lithium battery according to claim 15, wherein the additive is provided in an amount from 0.01 to 10% by weight relative to the total weight of the electrolyte.

18. The lithium battery according to claim 17, wherein the amount of the additive is from 0.05 to 5% by weight relative to the total electrolyte volume.

19. The lithium battery according to claim 18, wherein the amount of the additive is from 0.05 to 2% by weight relative to the total weight of the electrolyte.

20. The lithium battery according to claim 15, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (where x and y are natural numbers), LiCl, LiI, and combinations thereof.

21. The lithium battery according to claim 15, wherein the lithium salt is provided at a concentration from 0.6 to 2.0 M.

22. The lithium battery according to claim 15, wherein the non-aqueous organic solvent is selected from the group consisting of carbonate-based solvents, ester-based solvents, ether-based solvents, ketone-based solvents, and combinations thereof.

23. The lithium battery according to claim 22, wherein the solvent is selected from the group consisting of dimethyl carbonate (DMC), diethyl carbonate (DEC), dipropyl carbonate (DPC), methyl propyl carbonate (MPC), ethyl propyl carbonates (EPC), methyl ethyl carbonate (MEC), ethylene carbonate (EC), propylene carbonate (PC), butylene carbonate (BC), and combinations thereof.

24. The lithium battery according to claim 22, wherein the solvent comprises a mixed solvent of a cyclic carbonate and a chain carbonate.

25. A lithium battery comprising:
an electrolyte comprising a non-aqueous organic solvent having a mixed solvent of a carbonate solvent and an aromatic solvent; a lithium salt; and an additive selected from the group consisting of compounds represented by Formula 1, Formula 2, and combinations thereof:

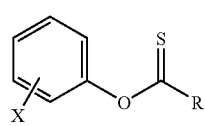

(1)

-continued

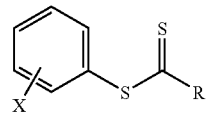

(2)

where X is selected from the group consisting of hydrogen, halogens, alkyl groups having from 1 to 6 carbon atoms, and aryl groups having from 6 to 8 carbon atoms, and R is an alkyl group having from 1 to 6 carbon atoms or an aryl group having from 6 to 10 carbon atoms;

a positive electrode comprising a positive active material being capable of intercalating and deintercalating lithium ions; and a negative electrode comprising a negative active material being capable of intercalating and deintercalating lithium ions.

26. The lithium battery according to claim 25, wherein the aromatic solvent is a compound of Formula 3:

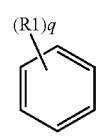

(3)

where R1 is selected from the group consisting of halogen, alkyl groups having from 1 to 10 carbon atoms, and combinations thereof, and q is an integer of from 0 to 6.

27. The lithium battery according to claim 25, wherein the aromatic solvent is selected from the group consisting of benzene, fluorobenzene, toluene, fluorotoluene, trifluorotoluene, xylene, and combinations thereof.

28. The lithium battery according to claim 25, wherein the carbonate solvent and the aromatic solvent are mixed in a volume ratio from 1:1 to 30:1.

* * * * *